United States Patent [19]

Schulhof et al.

[11] 4,080,236

[45] Mar. 21, 1978

[54] METHOD OF MAKING A DISPLAY FOLDER

[75] Inventors: Thomas B. Schulhof; Ronald M. Schulhof, both of New York, N.Y.

[73] Assignee: Quadriga Art Co., Inc., Port Chester, N.Y.

[21] Appl. No.: 736,733

[22] Filed: Oct. 29, 1976

Related U.S. Application Data

[62] Division of Ser. No. 610,321, Sep. 4, 1975.

[51] Int. Cl.[2] .............................................. B32B 31/00

[52] U.S. Cl. .................................... 156/220; 156/226; 156/268; 156/253

[58] Field of Search ............... 156/268, 267, 250, 253, 156/248, 220; 428/14, 134, 138, 172; 40/158 R

[56] References Cited

U.S. PATENT DOCUMENTS

| | | | |
|---|---|---|---|
| 563,002 | 6/1896 | Zoller | 428/14 X |
| 907,868 | 12/1908 | Pfister | 428/138 |
| 1,469,554 | 10/1923 | Crowder | 428/138 |
| 2,120,456 | 6/1938 | Barnes | 428/14 X |
| 3,212,542 | 10/1965 | Miller et al. | 156/268 |

*Primary Examiner*—Douglas J. Drummond
*Attorney, Agent, or Firm*—Darby & Darby

[57] ABSTRACT

A method of making a display folder is disclosed. The method comprises the steps of providing a sheet of display material having an area to be viewed on one side thereof and then adhering the side of the sheet of display material opposite the viewed side to a base sheet of substantially rigid material. A top sheet of substantially rigid material is then adhered to the viewed side of the sheet of display material by means of an adhesive material, the adhesive material being disposed solely on a portion of the sheet outward of the area to be viewed, thereby sandwiching the sheet of display material between the base and the top sheets to define a panel assembly. The top sheet is then die-cut to form the outline of an aperture, the outline being interior of the adhesive material and outward of the area to be viewed for permitting removal of the portion of the top sheet interior of the outline. Finally, the interior portion of the top sheet is removed to expose the area to be viewed whereby the remaining portion of the top sheet forms a frame around the area to be viewed.

9 Claims, 13 Drawing Figures

METHOD OF MAKING A DISPLAY FOLDER

This is a division of application Ser. No. 610,321, filed Sept. 4, 1975.

BACKGROUND OF THE INVENTION

The present invention relates generally to a folder, and more particularly to a display folder for exhibiting a picture, a certificate and the like therein which are permanently secured in the display folder, and the method of making same.

The prior art discloses many ways to hold a picture, certificate and the like in a folder which acts as a carrier piece. In one prior art folder, the picture and certificate are each held separately by four corner ribbons, under which the corners of the picture and certificate are slid. However, this folder has an unfinished look because of the exposed ribbons. Additionally, the process of using such ribbons is slow and costly, where both the picture and certificate must be hand inserted under the ribbons, one at a time. Furthermore, the picture and certificate are not permanently secured in the folder, and therefore may be easily moved or separated therefrom.

An alternative prior art method is to insert the picture and certificate into a slit under a top sheet having a die-cut frame on each of the panels so that the picture and certificate can be viewed. However, the insertion of the picture and certificate into the frame slit is costly, and requires manual insertion thereof. In addition, the picture and certificate must be small enough to get through the slits in order to be inserted, where once they are inserted, there is room for movement therebetween so that the picture and certificate may be moved, knocked askew or tilted during movement or transportation of the folder.

SUMMARY OF THE INVENTION

Accordingly, it is an object of the present invention to provide a display folder and a method of making same which overcomes the disadvantages of the prior art.

It is another object of the present invention to provide a display folder having a picture, certificate and the like permanently encased into the frame of the folder so that the picture, certificate and the like cannot become askew, tilted, etc. during movement or transportation of the display folder.

It is a further object of the present invention to provide a display folder that is simple and inexpensive to manufacture, where the permanent nature of the construction has a psychological attraction.

It is yet another object of the present invention to provide a method for making a display folder which is both simple and inexpensive.

It is still another object of this invention to provide a method for making a display folder in which a display to be viewed is fixedly mounted.

It is a still further object of the present invention to provide a display folder which is formed as an integral unit giving the appearance of a one-piece arrangement, and thus providing a permanency befitting the use of the folder.

It is an added object of the present invention to provide a display folder as mentioned above, where an aperture is die-cut after the display has been positioned therein, to provide a frame around the display.

And yet another added object of the present invention is to provide a display folder having a picture and certificate therein, which can be used as a remembrance for a deceased person and which can be retained by the deceased's family for many years.

Generally speaking, the objectives of the present invention are attained by a method for forming a display member comprising the steps of providing a sheet of display material having an area to be viewed on one side thereof, adhering the side of the sheet of display material opposite said one side to a base sheet of substantially rigid material, adhering a top sheet of substantially rigid material to said one side of the sheet of display material by means of an adhesive material, the adhesive material being disposed solely on a portion of the sheet outward of the area to be viewed, thereby sandwiching the sheet of display material between the base and top sheetsto define a panel assembly, die-cutting through the top sheet to form the outline of an aperture, the outline being interior of the adhesive material and outward of the area to be viewed for permitting removal of the portion of the top sheet interior of the outline, and removing the interior portion of the top sheet to expose the area to be viewed whereby the remaining portion of the top sheet forms a frame around the area.

DETAILED DESCRIPTION OF THE PREFERRED EMBODIMENT

Figure 1:
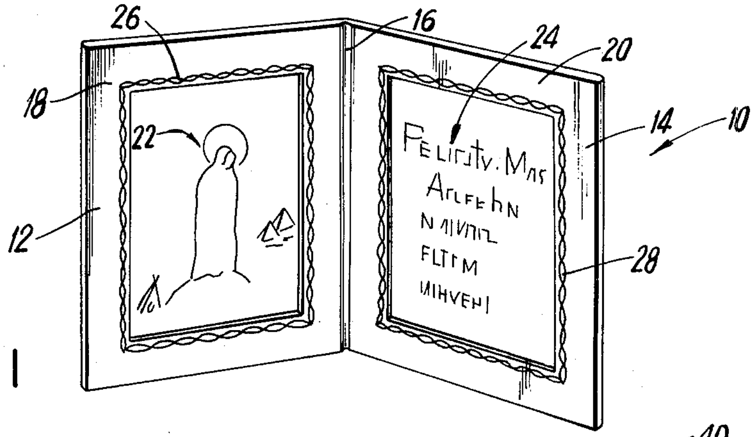
FIG. 1 illustrates a perspective view of a display folder according to the present invention.

Referring now to the drawings, FIG. 1 shows the present invention comprising a display folder generally denoted by the reference character 10. The primary purpose of the folder 10 is for use as a remembrance for a deceased person, which is retained by the deceased's family for many years, so that the permanent nature of the folder 10 has a psychological attraction befitting the use of the folder. The folder 10 includes two cover members 12 and 14 connected together by a spine 16 to permit the cover members 12, 14 to be folded together like a book. The inside pages 18 and 20 of cover members 12 and 14, respectively, are provided with printed displays, such as a picture 22 on page 18 and an enrollment certificate 24 on page 20. Preferably, decorative gold stampings 26, 28 are disposed on the pages around each of the displays 22, 24 respectively.

Figure 2:
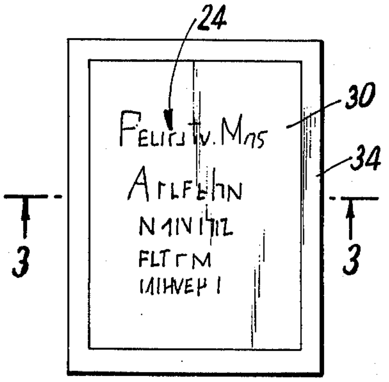
FIG. 2 illustrates a step in the method of making the display folder, showing a top plan view of a display sheet mounted on a base sheet.
Figure 3:
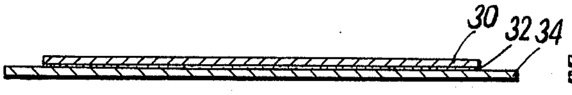
FIG. 3 illustrates an enlarged cross sectional view taken along the line 3—3 in FIG. 2.

FIGS. 2 and 3 disclose an initial operation in the construction of the folder 10. For simplicity, only the method of forming one panel assembly is discussed, but it is understood that the other panel assembly is formed in a similar manner. The display 24 is printed on a sheet 30 which is only slightly larger than the eventual size of the display 24 which will be showing, as the area to be viewed, when the frame is finished. The display sheet 30 is secured by conventional means 32, such as an adhesive material, glue and the like, to a blank piece of chipboard 34 defining a base sheet of substantially rigid material, so that a border is provided around the display sheet 30. The base sheet 34 has already been cut to the finished dimensions of the folder.

Figure 4:
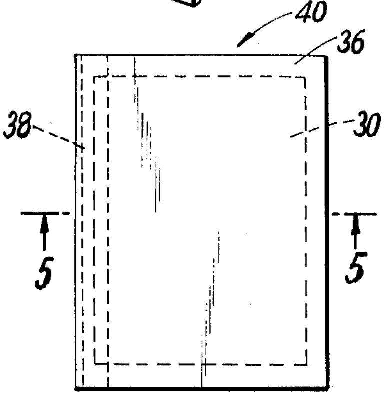
FIG. 4 illustrates another step in the method, showing a top plan view of a top sheet disposed on the display sheet and base sheet.
Figure 5:
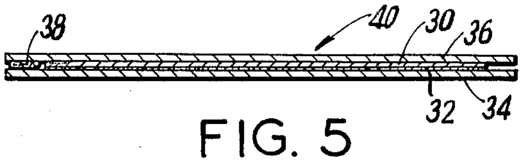
FIG. 5 illustrates an enlarged cross sectional view taken along the line 5—5 in FIG. 4.

Another blank piece of chipboard 36, of the same identical size and material of the chipboard 34, is provided to define a top sheet of substantially rigid material. As shown in FIGS. 4 and 5, the top sheet 36 is disposed over the display sheet 30 and secured thereto by conventional means 38, such as an adhesive material, glue or the like. The adhering means 38 is illustrated as being applied as a glue strip along one of the vertical edges of the display sheet 30 and the base and top sheets 34, 36, so that the glue strip 38, in addition to gluing together the display sheet 30 and top sheet 36, also glues together the vertical edge portions of the top and base sheets 36, 34 that is, within the area to be viewed. It will be understood, however, that for reasons more fully provided below, the adhering means may be applied to more than one of the outside edges of the sheet 30, the only limitation being that no adhering means 38 may be applied to the sheet 30 within the area of the display 24.

This gluing operation is an important feature of the present invention and the glue strip 38 must be applied carefully so that, as noted above, no glue is deposited on the display 24 or 22, thereby permitting the overlaid piece of chipboard 36 in the area of the printed certificate 24 or picture 22 to be cut away and not stuck to either of the areas to be viewed, the picture 22 or certificate 24, as will be explained hereinafter below in broad detail. Thus, the display sheet 30 having the display certificate 24 thereon is sandwiched between the top sheet 36 and the base sheet 34 to define a panel assembly 40.

Figure 6:
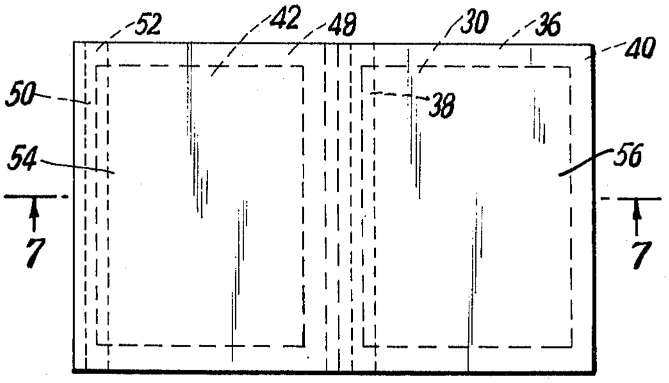
FIG. 6 illustrates a further method step, showing a top plan view of an overlay cover material encasing two adjacent panel assemblies.
Figure 7:
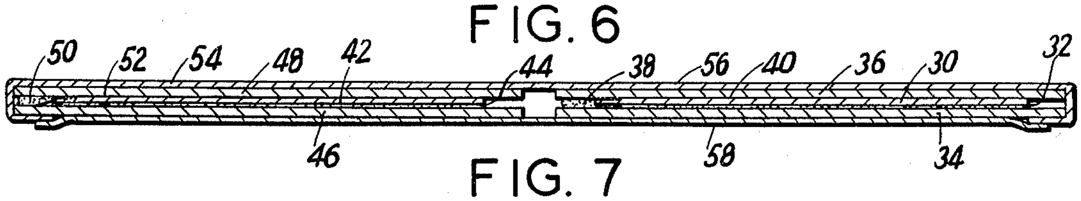
FIG. 7 illustrates an enlarged cross sectional view taken along the line 7—7 in FIG. 6.

By the above-mentioned method, a display sheet 42 having the picture 22 printed thereon, is glued by adhering means 44 to a base sheet 46, as shown in FIGS. 6 and 7. Additionally, a top sheet 48 is secured by a gluing strip 50 disposed along a vertical edge thereof to the corresponding vertical edges of the display sheet 42 and base sheet 46 in the same manner and for the same purpose as mentioned above, i.e., to sandwich the display sheet 42 between the base and top sheets 46, 48 to provide a second panel assembly 52.

The two panel assemblies 40, 52 containing the display sheets 30, 42, respectively, are placed side-by-side as shown in FIGS. 6 and 7, and are machine wrapped in a decorative cover material 54 in a conventional manner well known in the art. The machine wrapping is on all sides and edges, so that the two panels 40, 52 are encased therein with no exposed chipboards 34, 36, 46 and 48. The decorative cover material 54 includes a first overlay material 56 secured by conventional adhesive means to the outer surfaces of the top sheets 36 and 48, and a second overlay material 58 which is secured by conventional adhesive means to the base sheets 34 and 46, and also overlaps the first overlay material 56 as shown in FIG. 7 to provide a finished appearance thereof. Preferably, the central portions of the overlay material disposed between the panel assemblies 40, 52 are not secured together, and define the above-mentioned spine 16 to permit folding of the cover members 18 and 20. The cover material 54 also serves to hold the top sheets 36, 48 and base sheets 34, 46 together.

Figure 8:
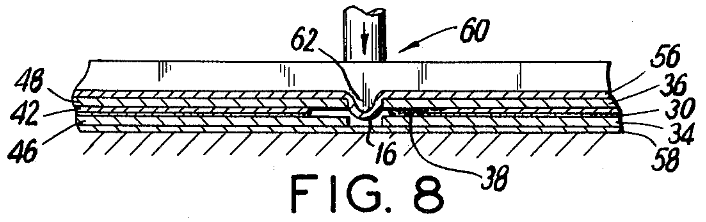
FIG. 8 illustrates a fragmentary cross sectional view showing the step of stamping a decorative imprint on the folder.

Preferably, the next step is to stamp the decorative imprints 26 and 28 onto the surface of the overlay material 56. Preferably, the imprints 26, 28 are decorative gold stampings, which are stamped by a conventional stamping apparatus 60. Additionally, the decorative gold stamping can be applied on the front or rear pages of the folder 10 defined by the overlay material 58, such being performed in a conventional manner. Furthermore, during the stamping operation, the spine 16 can be formed by a protuberance 62 provided on the stamping apparatus 60, as shown in FIG. 8.

Figure 9:
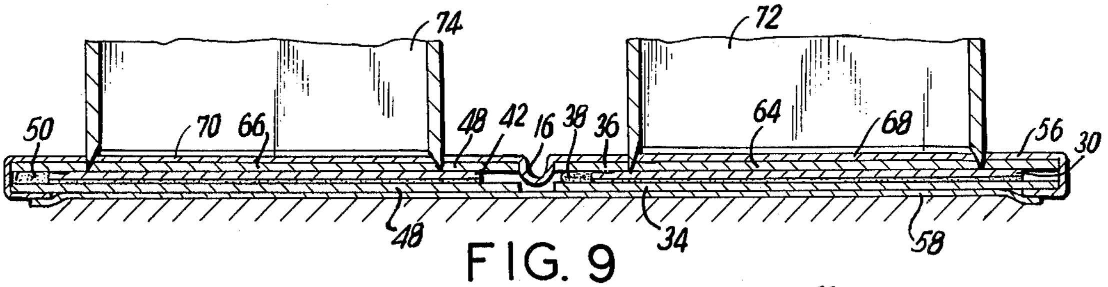
FIG. 9 illustrates a fragmentary cross sectional view showing the step of die-cutting the folder.
Figure 10:
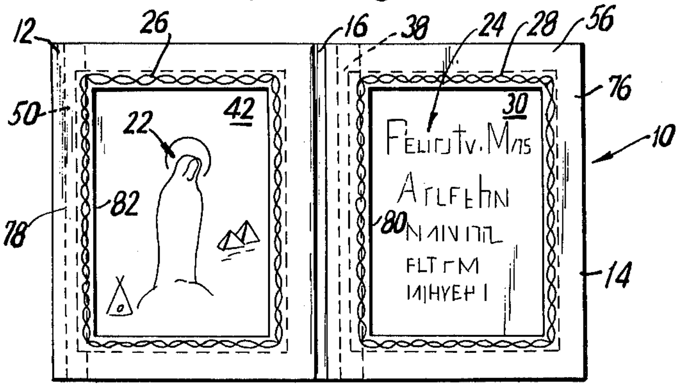
FIG. 10 illustrates a top plan view of the finished folder.

The next step, as shown in FIG. 9, is to die-cut away portions 64, 66 of the top sheets 36, 48, respectively, and those portions 68, 70 of the overlay material 56 which are attached to the top sheet portions 64, 66, respectively. The die-cutters 72, 74 are conventional and well known in the art, where the die-cutting operation can be performed simultaneously as indicated in FIG. 9, or can be performed individually for each top sheet, such depending upon the type of conventional die-cutting apparatus being used in the operation. Accordingly, the die-cut materials 64, 68 and 66, 70 are removed to expose the certificate 24 and the picture 22, respectively, thereby forming the frames 76 and 78 around each of the areas to be viewed, the displays 24, 22, as shown in FIG. 10.

It is now apparent why the positioning of the glue strips 38, 50 is important. Had there been an overall gluing of the top sheets 36, 48 to the display sheets 30, 42, it would not have been possible to free the cutaway portions 64, 66 from the display sheets 30, 42 after the die-cutting operation. As clearly shown in FIGS. 9 and 10, the edges 80 and 82 of each of the apertures formed by the die-cutters is interior of the respective glue strips 38 and 50 and outward of the respective areas to be viewed, thereby permitting removal of the die-cut material, since no adhesive material was in contact with the areas to be viewed, the displays 22, 24 at any time during the above-mentioned operations.

Figure 11:
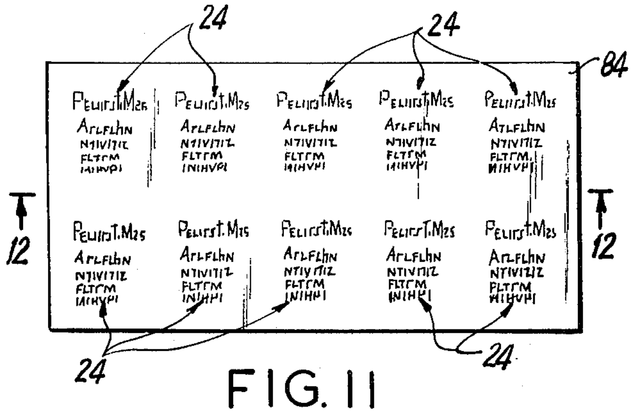
FIG. 11 illustrates a top plan view of a modified step in the method of making the folder, showing a large printed sheet having multiple displays thereon.
Figure 12:
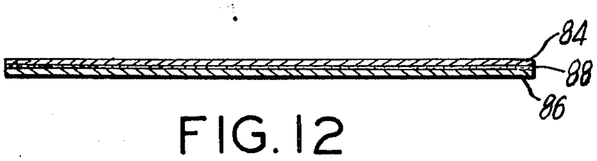
FIG. 12 illustrates a cross sectional view taken along the line 12—12 in FIG. 11.
Figure 13:
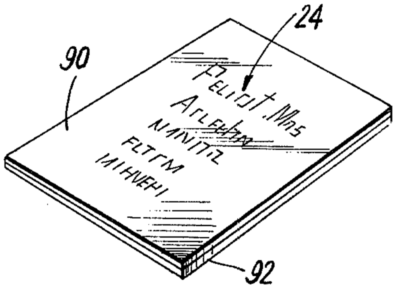
FIG. 13 illustrates an enlarged perspective view of a display sheet cut from the large printed sheet of FIGS. 11 and 12.

FIGS. 11–13 show an alternate method of securing the display sheet to the base sheet, this procedure being the same for both the picture 22 and the certificate 24. As shown in FIG. 11, a large sheet 84 is imprinted with multiple certificates 24, or pictures 22 (not shown). Each area to be viewed on the sheet 84 is spaced from each other such area by a region of the sheet 84 not containing an area to be viewed. The large printed sheet 84 is then secured to a large base sheet 86 fabricated from chipboard, being secured by conventional means 88 such as an adhesive material or glue, as shown in FIG. 12. The large chipboard 86 and the large printed sheet 84 pasted thereon are then cut so as to provide a plurality of separated individual areas to be viewed, each area being surrounded by a portion of a region of the sheet 84 not containing an area to be viewed, each area to be viewed and its surrounding portion being the size of the finished folder, as shown in FIG. 13. Accordingly, the individual display sheet 90 (the area to be viewed and its surrounding portion) having the certificate 24 thereon, or picture 22 thereon (not shown), is equal to the full size of the cut base sheet 92, and also equal to the full size of the finished folder. The process for forming the folder 10 with the display sheet 90 and base sheet 92 is the same as mentioned above.

Preferably, a specially high gloss paper is used for the printing of the certificate 24. In addition, by the use of a special application of the printing of the picture 22 and certificate 24, it is possible to obtain an even higher gloss, which serves as a substitute for acetate. Thus, this higher gloss makes it unnecessary to use such acetate over the picture or certificate, as is the normal practice in the prior art which uses the ribbon folders and slit insertion folders. Furthermore, it is possible to specially treat the certificate 24 so that it is receptive to ink, so that the enroller's name can be written thereon.

Thus, the above-mentioned unique method of sandwich construction enables the manufacturer to eliminate the hand insertion through the slit or ribbon folder that has heretofore been required. The economic saving of this feature is significant, as is the fact that the cost of the basic construction of the folder is also less expensive than that mentioned in the prior art. The folder of the present invention has a permanency of encasement feature which in view of the ultimate usage it receives, is considered an attribute.

Because of the method of construction of the present invention, the enclosured picture and certificate are not subject to movement, and the positions in which they are glued down are the positions in which they stay. As many of these types of folders are mailed to the ultimate recipients, the fact that the jostling they receive in the mail does not, in the folder of the present invention, affect the position of the picture and certificate, provides an advantage which is not present in the prior art folders.

Numerous alterations of the structure herein disclosed will suggest themselves to those skilled in the art. However, it is to be understood that the present invention relates to a preferred embodiment of the invention which is for purposes of illustration only and is not to be construed as a limitation of the invention.

What is claimed is:

1. A method of forming a display member comprising the steps of:
   providing a sheet of display material having an area to be viewed on one side thereof;
   adhering the side of said sheet of display material opposite said one side to a base sheet of substantially rigid material;
   adhering a top sheet of substantially rigid material to said one side of said sheet of display material by means of an adhesive material, said adhesive material being disposed solely on a portion of said sheet outward of said area to be viewed, thereby sandwiching said sheet of display material between said base and top sheets to define a panel assembly;
   die-cutting through said top sheet to form the outline of an aperture, said outline being interior of said adhesive material and outward of said area to be viewed for permitting removal of the portion of the top sheet interior of said outline; and
   removing said interior portion of said top sheet to expose said area to be viewed whereby the remaining portion of said top sheet forms a frame around said area.

2. A method of forming a display member according to claim 1 further comprising the step of adhering an overlay cover material to said panel assembly prior to said step of cutting whereby said overlay cover material completely encloses said panel assembly and is continuous at the borders thereof, and further wherein said step of cutting through said top sheet includes cutting through a corresponding portion of said overlay cover material and wherein said step of removing said portion of said top sheet includes removing a corresponding portion of said overlay cover material.

3. A method as claimed in claim 2, including the step of stamping a decorative imprint onto a surface of said overlay cover material after said overlay cover material encloses said panel assembly.

4. A method as claimed in claim 2, wherein said panel assembly is formed in at least one member of a folder having first and second members connected together by a spine to permit said folder members to be folded together with said area to be viewed positioned inside said folder between said folder members, said overlay cover material forming an outer surface of each of said folder members and providing said spine.

5. A method as claimed in claim 4, wherein said panel assembly is formed in each of said folder members with said area to be viewed of each panel assembly being positioned to face each other when said folder is in a folded position.

6. A method as claimed in claim 5, including the step of stamping a decorative imprint onto a surface of said overlay cover material outward of each of said areas to be viewed after said overlay cover material encases each of said panel assemblies and before cutting each of said aperture outlines.

7. A method of forming a display member comprising the steps of:
   providing a plurality of individual areas to be viewed on one side of a sheet of display material, each of said areas to be viewed being spaced from each of the other of said areas by a region of said sheet not containing an area to be viewed;
   adhering the side of said sheet of display material opposite said one side to a base sheet of substantially rigid material, the sheet of substantially rigid material being generally co-extensive with said sheet of display material;
   cutting said sheet of display material and said base sheet so as to provide a plurality of separated individual areas to be viewed, each area being surrounded by a portion of a region, each area and its surrounding portion being adhered to a portion of said base sheet co-extensive with such separated area and surrounding portion;
   adhering a top sheet of substantially rigid material to the surrounding portion of each of said separated areas to be viewed at said one side thereof by means of an adhesive material, said adhesive material being disposed solely within said surrounding portion, thereby sandwiching said individual area and its surrounding portion between said portion of said base sheet and said top sheet to define a panel assembly;

die cutting through said top sheet to form the outline of an aperture, said outline being interior of said adhesive material and outward of said area to be viewed for permitting removal of the portion of the top sheet interior of said outline;

and removing said interior portion of said top sheet to expose said individual area to be viewed whereby the remaining portion of said top sheet forms a frame around said individual area.

8. A method of forming a display member according to claim 7 further comprising the step of adhering an overlay material to said panel assembly whereby said overlay material completely encloses said panel assembly and is continuous at the borders thereof, and further wherein said step of cutting through said top sheet includes cutting through a corresponding portion of said overlay material and wherein said step of removing said interior portion of said top sheet includes removing a corresponding portion of said overlay material.

9. A method of forming a display folder comprising the steps of:

providing first and second panel assemblies, the method of forming each of said panel assemblies including the steps of providing an area to be viewed on one side of a sheet of display material, adhering the side of said sheet of display material opposite said one side to a base sheet of substantially rigid material, and adhering a top sheet of substantially rigid material to said one side of said sheet of display material by means of an adhesive material, said adhesive material being disposed solely on a portion of said sheet outward of said area to be viewed, thereby sandwiching said sheet of display material between said base and top sheets;

adhering an overlay material to said first and second panel assemblies whereby said overlay material completely encloses said first and second panel assemblies and is continuous at the borders of each of said assemblies, thereby defining first and second folder members, said overlay material connecting said first and second folder members and forming a spine therebetween;

die cutting through each of said top sheets and the corresponding portion of said overlay material adhering to each of said top sheets to form the outline of an aperture in each of said folder members, said outline being interior of said adhesive material and outward of said area to be viewed for permitting removal of the portion of the top sheet and overlay material interior of said outline; and removing said interior portion of said top sheet and the corresponding portion of said overlay material from each of said folder members to expose each of said areas to be viewed, whereby the remaining portion of said top sheet and the remaining portion of the overlay material adhering thereto on each of said folder members forms a frame around each of said areas.

* * * * *